(12) United States Patent
Rapeanu

(10) Patent No.: US 6,351,073 B1
(45) Date of Patent: Feb. 26, 2002

(54) SELF-SUPPLIED DC/DC SWITCHING POWER SUPPLY

(75) Inventor: Radu Rapeanu, Montreal (CA)

(73) Assignee: Thomas & Betts International, Inc., Sparks, NV (US)

(*) Notice: Subject to any disclaimer, the term of this patent is extended or adjusted under 35 U.S.C. 154(b) by 0 days.

(21) Appl. No.: 09/709,217

(22) Filed: Nov. 9, 2000

Related U.S. Application Data

(60) Provisional application No. 60/164,517, filed on Nov. 10, 1999.

(51) Int. Cl.[7] .................................................. B60Q 1/00
(52) U.S. Cl. ......................... 315/77; 323/299; 315/307
(58) Field of Search .................. 323/222, 299, 323/282, 284, 285, 289, 268, 271; 315/291, 307, 77; 363/21.01, 97, 71, 34, 37, 41, 56

(56) References Cited

U.S. PATENT DOCUMENTS

| | | | |
|---|---|---|---|
| 3,563,221 A | * | 2/1971 | Tada ........................... 123/598 |
| 3,660,749 A | | 5/1972 | Kadri |
| 4,084,219 A | | 4/1978 | Furukawa et al. |
| 4,162,524 A | | 7/1979 | Jansson |
| 5,196,995 A | * | 3/1993 | Gulczynski .................. 363/16 |
| 5,239,453 A | | 8/1993 | Remson |
| 5,611,163 A | | 3/1997 | Smith |
| D383,501 S | | 9/1997 | Andre et al. |
| 5,945,820 A | | 8/1999 | Namgoong et al. |
| 6,011,702 A | | 1/2000 | Gucyski |
| 6,088,250 A | | 7/2000 | Siri |
| 6,104,173 A | * | 8/2000 | Kojima ........................ 323/222 |
| 6,239,585 B1 | * | 5/2001 | Buono ......................... 323/282 |

\* cited by examiner

*Primary Examiner*—Rajnikant B. Patel
(74) *Attorney, Agent, or Firm*—Hoffmann & Baron, LLP

(57) ABSTRACT

The present invention provides a self-supplied DC/DC switching power supply circuit for emergency notification and similar applications. The circuit includes a control circuit in electrical communication with an igniter circuit. The igniter circuit provides a temporary activation voltage to the control circuit for activation thereof. The igniter circuit provides the activation voltage for a limited time duration sufficient for enablement of the switching power supply circuit after which time power is supplied to such control circuit by the output voltage. The present invention SPS circuit can use a single-cell battery pile or other low-voltage source as low as 0.3V DC while realizing improved efficiency over a wide range of input voltages.

5 Claims, 4 Drawing Sheets

SELF-SUPPLIED DC/DC SWITCHING POWER SUPPLY

This application claims Priority to U.S. Provisional application Ser. No. 60/164,517 field on Nov. 10, 1999.

FIELD OF THE INVENTION

In general, the present invention relates to switching power supplies. In particular, the present invention is directed to a self-supplied DC/DC switching power supply that is fully operational with a minimum input voltage and thereby provides improved regulation and efficiency within a wide range of input voltages.

BACKGROUND OF THE INVENTION

Notification of an emergency is critical in a number of industrial applications, including but not limited to hospitals, military installations, traffic control installations, weather monitoring systems, manufacturing processes, nuclear facilities, large banking facilities and elevators. Computers and data processing equipment that enable such systems to operate often implement essential circuitry to provide visual or audio indicia (i.e., lighting, sirens or the like) that direct personnel to safety in the event of a threat to human life or property.

Circuitry of this type often includes a switching power supply (SPS) circuit. SPS circuits have certain properties that make them desirable. For instance, there is very little power dissipation, making switching supplies very efficient even if there is a large drop from input to output. Switching power supplies can also generate output voltages that exceed the input voltage such that they can run directly from a rectified power line with no AC power transformer. The result is a compact, lightweight and efficient power supply that is desirable for universal use in computers and computer-aided devices.

Since many electrical devices (including emergency notification devices) typically require DC power, a particularly useful type of SPS circuit is a DC/DC converter. Building power is typically 120 volts AC or greater, requiring a power supply to obtain the DC voltage necessary to operate such devices. DC/DC converters are highly efficient and economical devices that convert a DC voltage from a source such as a battery into a high DC voltage that can energize LEDs, lamps, buzzers and similar emergency notification devices. Typically the output produced is at a different voltage level than the input, however, some converters have the same input and output and are used to provide noise isolation, power bus regulation and similar functions.

In a conventional DC/DC converter as illustrated in FIG. 1, a switching power supply (SPS) circuit 1 includes input terminal 3 having an input voltage $V_{in}$ applied thereto by an external DC power source (not shown). Input terminal 3 is electrically connected to a control circuit 5 that drives a switching element 7 such as a transistor. Input terminal 3 is further connected to one end of an inductor 9 that is in series with each of switching element 7, control circuit 5 and a rectifying filter 11. Rectifying filter 11 includes diode 13 having an anode in electrical communication with each of inductor 9 and switching element 7 and a cathode in electrical communication with each of capacitor 15 and output terminal 17, at which a power supply output voltage $V_{out}$ is realized.

In operation, an external DC power supply applies an input voltage $V_{in}$ to circuit 1 at input terminal 3 such that a current instantly flows in a path from input terminal 3 to control circuit 5 and inductor 9. Almost immediately after input voltage $V_{in}$ is applied, such input voltage activates control circuit 5 and is subsequently applied to switching element 7. Switching element 7 periodically applies the full input voltage across inductor 9 for short intervals such that energy is stored in its magnetic field. The stored energy is transferred to filter 11 for rectification of the AC voltage by diode 13 and smoothing of the rectified DC voltage by capacitor 15.

In an SPS circuit of this type, the input voltage supplies the control circuit, thereby limiting the range of input voltages to a minimum value required to maintain operation of the control circuit. Reduction of the input voltage thus requires corresponding reduction of the lowest requisite voltage necessary to operate the control circuit. Because the lowest possible operation voltage of the elements (i.e. MOS transistors) constituting the control circuit is so restricted, the lowest achievable operation voltage for the SPS circuit is likewise limited. Such a restriction not only inhibits operation of the circuit below certain voltage thresholds. Existing designs that require a minimum input voltage (typically at least 0.75 V DC) also mandate the incorporation of expensive, sophisticated technologies like CMOS integrated circuits for reliable execution of SPS functions. The components comprising such technologies complicate such circuits, incurring additional costs associated with the acquisition, operation and maintenance thereof.

It is therefore desirable to provide a DC/DC converter that remains operative using a low input voltage source such as a low voltage battery pile. Such a converter would obviate the limitations on the circuit's operation that are currently imposed by the operation voltage requirements of a control circuit incorporated therewith.

SUMMARY OF THE INVENTION

It is an advantage of the present invention to provide a self-supplied DC/DC switching power supply circuit.

It is another advantage of the invention to provide a DC/DC switching power supply circuit having a control circuit supplied by two alternate sources.

It is yet another advantage of the present invention to provide a regulated output DC voltage source having small size and which is relatively inexpensive to produce.

It is still another advantage of the present invention to remove the limitation of input voltage values on the threshold required for activation of a control circuit and subsequent functionality of a switching power supply circuit within which the control circuit is implemented.

In the pursuit of these and other advantages, the present invention provides a self-supplied DC/DC switching power supply (SPS) circuit for emergency notification and similar applications. The circuit includes a control circuit in electrical communication with an igniter circuit. The igniter circuit provides a temporary activation voltage to the control circuit for activation thereof. The igniter circuit provides the activation voltage for a limited time duration sufficient for enablement of the SPS circuit after which time power is supplied to such control circuit by the output voltage. The present invention SPS circuit can use a single-cell battery pile or other low-voltage sources as low as 0.3VDC while realizing improved efficiency of the circuit over a wide range of input voltages.

DETAILED DESCRIPTION OF THE PREFERRED EMBODIMENTS

The present invention provides a self-supplied DC/DC switching power supply (SPS) circuit that maintains operation of itself using a low-voltage input source. The present invention boosts the performance of switching power supplies for emergency notification devices and like applications wherein operation must necessarily be maintained in conditions where power supply to the notification device is limited.

Now referring to the figures, wherein like elements are identically numbered, a preferred embodiment of a switching power supply (SPS) circuit 20 of the present invention is provided as a step-up converter. Circuit 20 includes an input terminal 22 having an input voltage $V_{in}$ applied thereto by an external DC power source. The input voltage may come from rectifying a regular AC line (i.e. 120V AC) supplied by a utility company or alternately derived from a low-voltage battery pile. Such battery pile is required for circuit 20 to remain functional in the event of a power failure.

Figure 1:
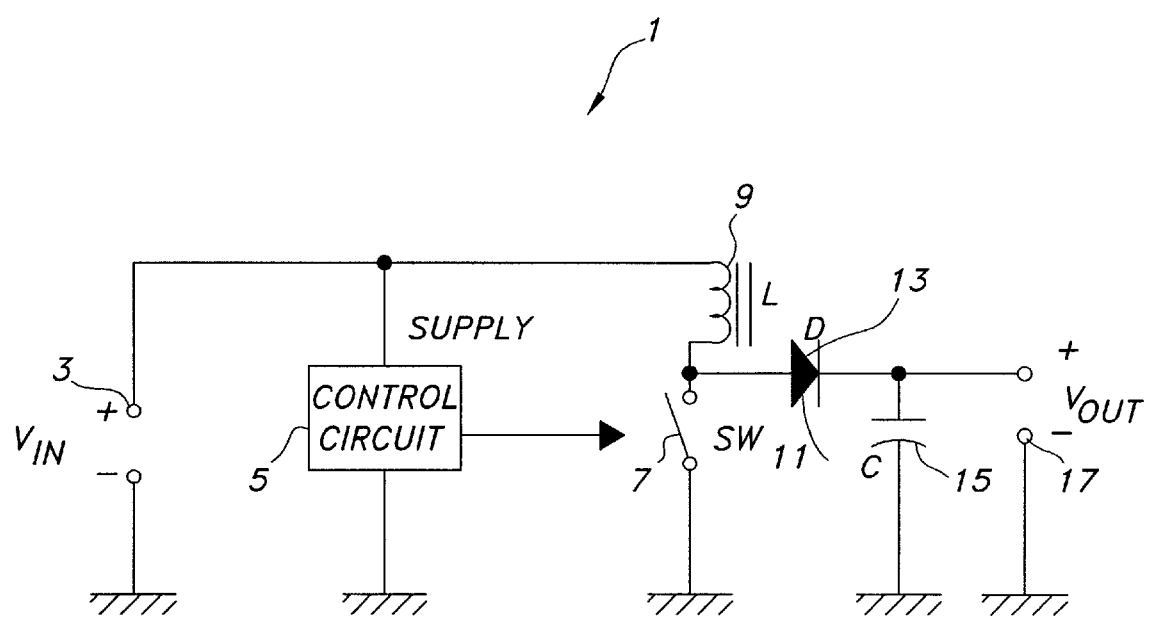
FIG. 1 is a block diagram of a conventional DC/DC switching power supply circuit.
Figure 2:
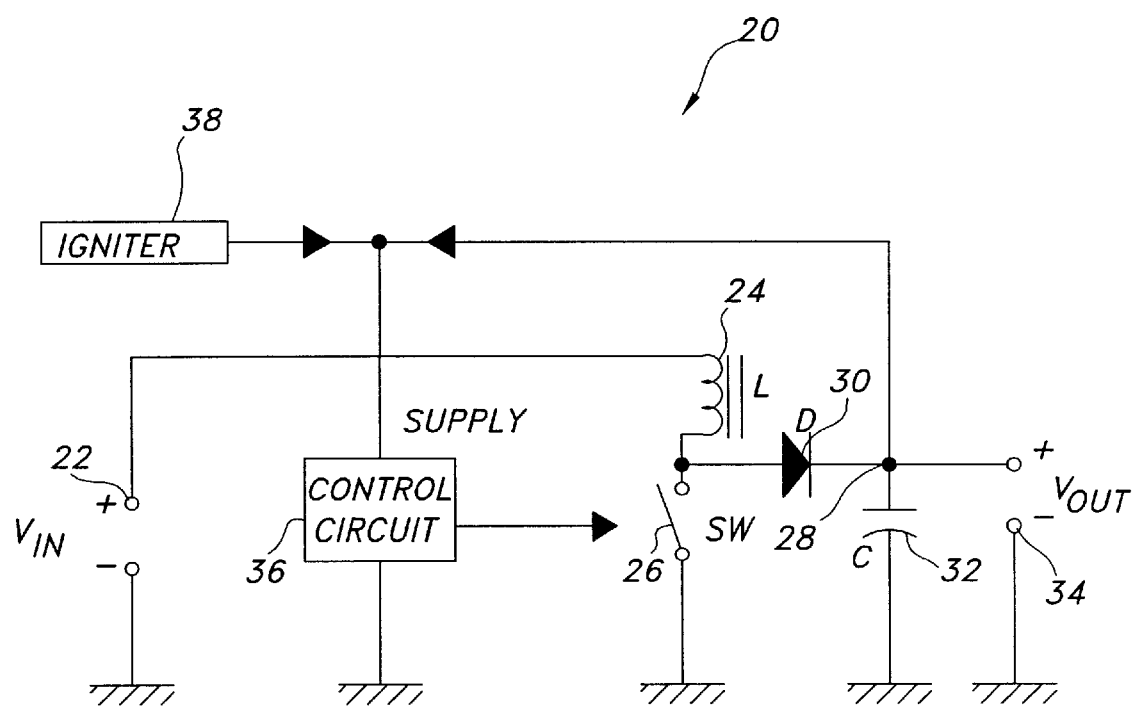
FIG. 2 is a block diagram of a preferred embodiment of a self-supplied DC/DC switching power supply circuit of the present invention.

Similar to the conventional circuit illustrated in FIG. 1, input terminal 22 of circuit 20 is electrically connected to one end of an inductor 24. An opposed end of inductor 24 is connected with each of a switching element 26 and a rectifying filter 28 wherein filter 28 includes each of diode 30 and capacitor 32. The anode of diode 30 is connected to each of inductor 24 and switching element 26, and the cathode of diode 30 is connected to each of capacitor 32 and an output terminal 34 from which a power supply output voltage $V_{out}$ is realized.

Circuit 20 further includes a control circuit 36 that drives switching element 26. Control circuit 36 may assume a plurality of configurations using inexpensive, versatile and readily available components such as bipolar semiconductors. A variety of such control circuit configurations are available and commonly known in the art, and any such configuration that is conducive to the operation of the present invention may be incorporated herewith.

Control circuit 36 is supplied by two alternate sources: an igniter circuit 38 in electrical communication therewith and power supply output voltage $V_{out}$. Igniter circuit 38 temporarily delivers a minimum activation voltage (i.e. about 1–2 V DC) to control circuit 36 for a limited time duration sufficient for activation thereof (i.e., 2–10 ms). Upon delivery of the activation voltage, such voltage is applied to switching element 26, thereby initiating operation of circuit 20. Like control circuit 36, igniter circuit 38 may assume a variety of configurations as is commonly known in the art.

Upon lapse of the delivery time, igniter circuit 38 ceases delivery of the activation voltage to control circuit 36 while input voltage $V_{in}$ continues to supply inductor 24. Power supply output voltage $V_{out}$ that is realized at output terminal 34 concurrently "self supplies" control circuit 36 with a stable DC voltage regardless of the value of input voltage $V_{in}$. In this manner, once circuit 20 is activated, the lowest realized input voltage $V_{in}$ is no longer dependent upon the voltage requirements of control circuit 36.

Figure 3:
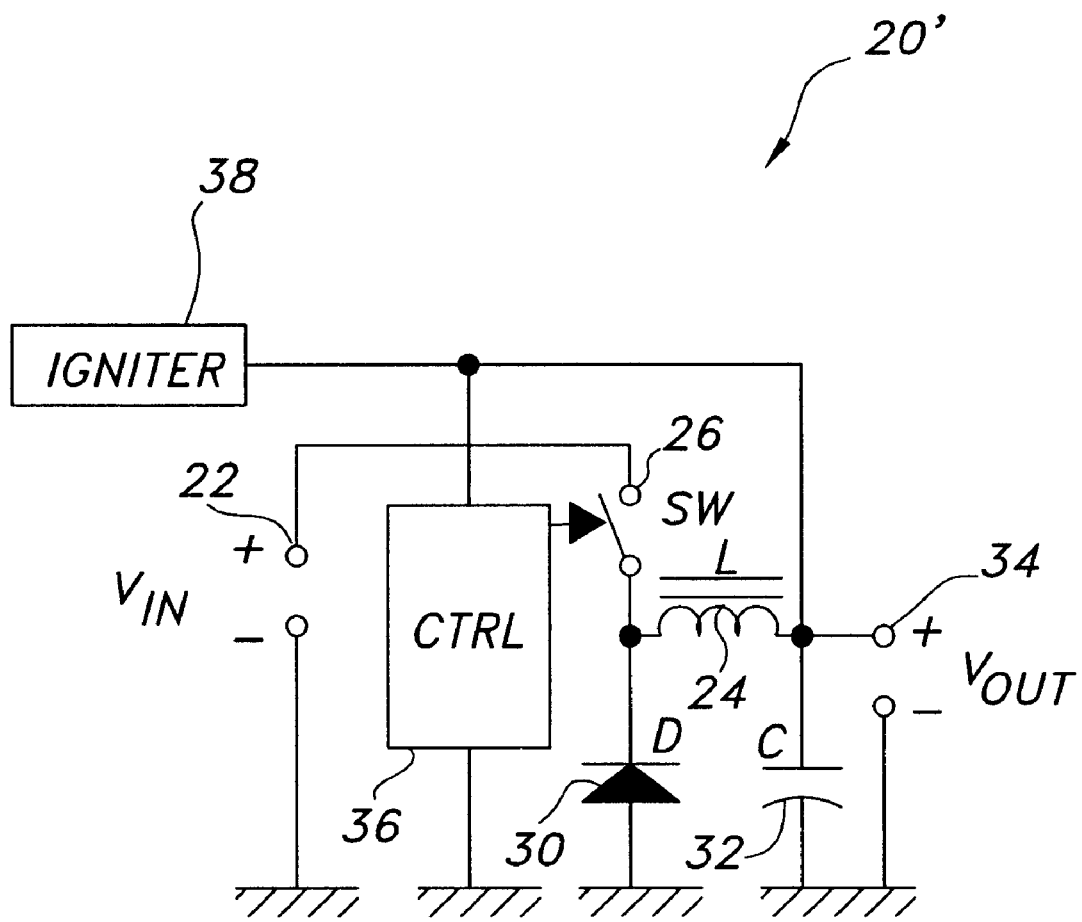
FIG. 3 is a block diagram of an alternate preferred embodiment of a self-supplied DC/DC switching power supply circuit of the present invention.
Figure 4:
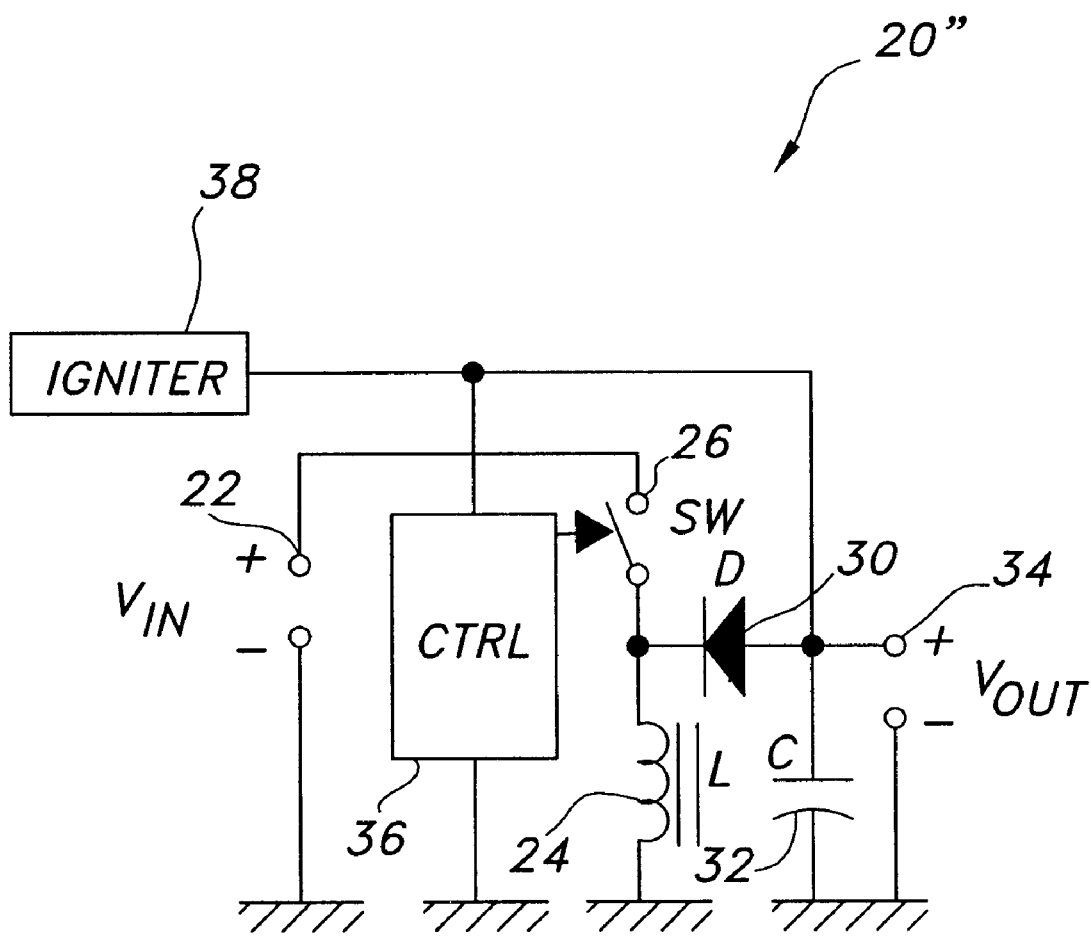
FIG. 4 is a block diagram of another alternate preferred embodiment of a self-supplied DC/DC switching power supply circuit of the present invention.

The SPS circuit of the present invention can be further adapted for step-down and inverter configurations, as illustrated in the alternate preferred embodiments in FIGS. 3 and 4, respectively. Referring particularly to FIG. 3, SPS circuit 20' is provided as a step-down configuration wherein $0<V_{out}<V_{in}$. The acquisition of a lower output voltage is effected by connection of one end of inductor 24 to each of switching element 25 and 30 and further connection of an opposed end of inductor 24 to each of capacitor 32, igniter 38 and output terminal 34. Further referring to FIG. 4, SPS circuit 20" is provided as an inverter configuration wherein the polarity of $V_{out}$ is opposite that of $V_{in}$. In all cases (step-up, step-down, inverter), control circuit 36 is supplied from each of igniter circuit 38 and the power supply output voltage $V_{out}$.

The SPS circuit of the present invention therefore realizes self-sufficiency at a low input voltage independent of the requisite activation voltage of the control circuit. Thus, it is now possible to significantly reduce the lowest voltage threshold that is required for the circuit to remain operative in view of a power failure or similar event that restricts the magnitude of the voltage input. A large range of input voltages may therefore be supplied without sacrificing the inherent simplicity or functionality of the circuit.

Various changes and modifications can be made to the present invention. It is intended that all such changes and modifications come within the scope of the invention as set forth in the following claims.

What is claimed is:

1. A self-supplied DC/DC switching power supply circuit, comprising:

an input terminal having an input voltage applied thereto by an external power source;

an output terminal from which a power supply output voltage is generated by said switching power supply circuit;

a rectifying filter including each of a diode and a capacitor for rectification of said input voltage;

a control circuit in electrical communication with a switching element for driving said switching element between an open gate position and a closed gate position for initiating operation of said switching power supply circuit;

an inductor in electrical communication with each of said switching element and one or both of said diode and said capacitor; and an igniter circuit in electrical communication with said control circuit for delivering a minimum activation voltage to said control circuit for a predetermined temporal duration sufficient for activation of said control circuit after which said temporal duration said power supply output voltage supplies said control circuit with a stable DC voltage independent of said input voltage.

2. The switching power supply of claim 1 wherein said external power source is either a rectified AC line or low-voltage battery pile.

3. The switching power supply of claim 1 wherein said power supply output voltage exceeds said input voltage.

4. The switching power supply of claim 1 wherein said input voltage exceeds said power supply output voltage.

5. The switching power supply of claim 1 wherein a polarity of said power supply output voltage is opposite a polarity of said input voltage.

* * * * *